United States Patent
Funakoshi et al.

(10) Patent No.: US 7,061,531 B2
(45) Date of Patent: Jun. 13, 2006

(54) SOLID STATE IMAGING DEVICE HAVING TIMING SIGNAL GENERATION CIRCUIT AND CLAMPING CIRCUIT

(75) Inventors: Hiromasa Funakoshi, Hirakata (JP); Ryoji Asada, Hirakata (JP); Kazumasa Motoda, Toyonaka (JP)

(73) Assignee: Matsushita Electric Industrial Co., Ltd, Kadoma (JP)

( * ) Notice: Subject to any disclaimer, the term of this patent is extended or adjusted under 35 U.S.C. 154(b) by 750 days.

(21) Appl. No.: 09/886,266

(22) Filed: Jun. 22, 2001

(65) Prior Publication Data
US 2001/0055068 A1 Dec. 27, 2001

(30) Foreign Application Priority Data
Jun. 26, 2000 (JP) .............................. 2000-190643

(51) Int. Cl.
H04N 9/64 (2006.01)
H04N 5/18 (2006.01)
H04N 1/46 (2006.01)

(52) U.S. Cl. ...................... 348/243; 348/689; 358/539

(58) Field of Classification Search ................ 348/243, 348/244, 245, 257, 615, 689, 294; 358/539
See application file for complete search history.

(56) References Cited

U.S. PATENT DOCUMENTS

| | | | | |
|---|---|---|---|---|
| 4,553,169 A | * | 11/1985 | Yoshioka et al. | 348/243 |
| 4,816,917 A | * | 3/1989 | Yamamoto et al. | 348/257 |
| 5,471,244 A | | 11/1995 | Wolfe | |
| 5,995,166 A | * | 11/1999 | Kawano | 348/689 |
| 6,580,465 B1 | * | 6/2003 | Sato | 348/689 |
| 6,587,144 B1 | * | 7/2003 | Kim | 348/241 |
| 6,597,395 B1 | * | 7/2003 | Kim et al. | 348/222.1 |
| 6,606,118 B1 | * | 8/2003 | Watanabe | 348/243 |
| 6,791,607 B1 | * | 9/2004 | Bilhan et al. | 348/243 |

FOREIGN PATENT DOCUMENTS

| | | | |
|---|---|---|---|
| DE | 2003455 B | * | 4/1977 |
| JP | 02009275 A | * | 1/1990 |
| JP | 4-196688 A | | 7/1992 |
| JP | 04291576 A | * | 10/1992 |
| JP | 04291590 A | * | 10/1992 |
| JP | 07184128 A | * | 4/1996 |
| JP | 08102893 A | * | 4/1996 |

OTHER PUBLICATIONS

Official Translation of Japanese Publ. No. 04-291576 A, Ralph McElroy Translation Company, Feb. 2005.*

* cited by examiner

*Primary Examiner*—Tuan Ho
*Assistant Examiner*—John M. Villecco
(74) *Attorney, Agent, or Firm*—Smith Patent Office (57) ABSTRACT

An imaging device uses a solid state imaging element, during multi-field accumulation to prevent shading and oscillatory phenomena such as repeated black and white patterns. A signal is supplied from a timing signal generation circuit to switches, and controls the ON/OFF operation. During the H period of the signal, the switch is closed, and the output value of an amplifier is input to a capacitor. During the L period of the signal, the switch is opened, and the average value of the output of the amplifier is maintained in the capacitor. During the H period, the switch is open, while during the L period, the switch is in the ON state. At this time, the level of the capacitor C2 and the output of the amplifier are input to an amplifier, and their difference is amplified and supplied to a capacitor C3 via the switch.

3 Claims, 12 Drawing Sheets

SOLID STATE IMAGING DEVICE HAVING TIMING SIGNAL GENERATION CIRCUIT AND CLAMPING CIRCUIT

BACKGROUND OF THE INVENTION

1. Field of the Invention

The present invention relates to a solid state imaging device, and more particularly relates to a solid state imaging device which comprises an optical black clamping circuit.

2. Discussion of the Related Art

From the past, as devices which form light from a photographic subject into an image, there have been known solid state imaging devices which utilize solid state imaging elements, such as charge coupled devices (hereinafter termed "CCD"s) and the like. In such a CCD, there is an optical black section (hereinafter "optical black" will be abbreviated as "OB") in which light is prevented from falling, and thus does not perform photoelectric conversion. Such an OB section is disposed before or after the effective picture elements of the CCD. Since no light is incident upon this OB section, its output, i.e. the OB level, corresponds to a black level signal. In a solid state imaging device which utilizes such a CCD, this OB signal is used as a reference for the black level of the picture signal, and a clamping procedure is performed so as to match the OB level to the reference level.

Figure 1:
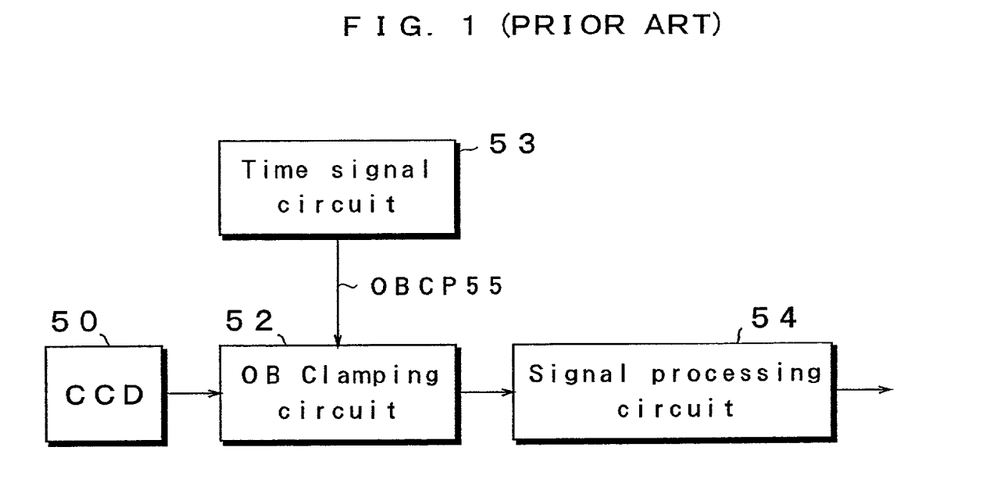
FIG. 1 is a block diagram showing an overall structural view of a solid state imaging device according to an example of the prior art.
Figure 2:
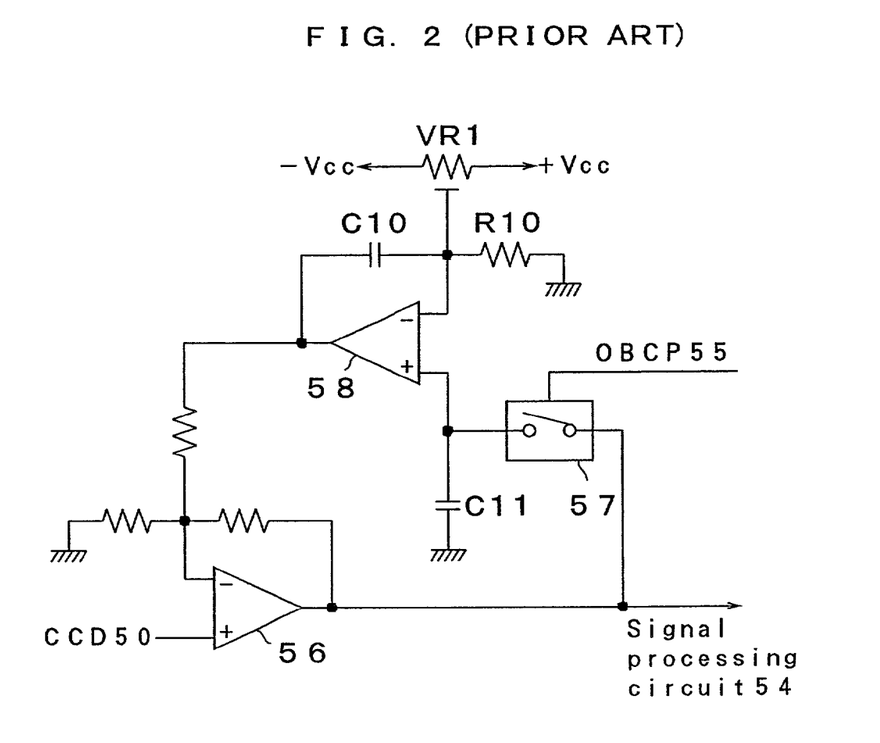
FIG. 2 is a block diagram of an OB clamping circuit incorporated therein.

FIG. 1 is an overall structural view showing a solid state imaging device which is an example of the prior art, while FIG. 2 is a block diagram of an OB clamping circuit incorporated therein. In FIG. 1, the output of a CCD 50 is inputted to an OB clamping circuit 52. In this OB clamping circuit 52, an OB section of the CCD 50 output is matched to a reference level by a signal OBCP 55 for OB clamping which is outputted from a timing signal generation circuit 53. After gamma and knee processing etc. have been performed by a signal processing circuit 54, it is thereafter outputted to the outside.

The operation of the OB clamping circuit 52 will now be explained with reference to FIG. 2. The output of the CCD 50 is inputted to the + side of an amplifier 56, and, after being amplified therein, is supplied via a switch 57 to a capacitor C11. The signal OBCP 55 is a control pulse, which performs closing action (turning ON) of a switch 57 at a timing corresponding to that of the OB section. When this is done, a voltage corresponding to that of the OB section of the CCD 50 output comes to be maintained in the capacitor C11.

Normally a dark current is included in the output of the CCD 50, and its values for the OB section and the effective picture element section are equal. Accordingly, the OB clamping operation, along with canceling the influence of the dark current, also performs the operation of adjusting the black level position.

The ends of a variable resistor VR1 are connected to the + and − sides of a voltage source Vcc, and the black level position is adjusted by adjustment of the variable resistor VR1. The output of the variable resistor VR1 is inputted to an amplifier 58 via a low pass filter (hereinafter termed an "LPF"), which is made up from a resistor R10 and a capacitor C10. In the amplifier 58, the level of the capacitor C11 and the output from the VR1 are compared, and their difference is amplified. Normally the open loop gain of an operational amplifier is about 100 dB (one hundred thousand times). In the amplifier 58, a gain of this level is attained as well. Accordingly, even if the potential difference between the − input and the + input of the amplifier 58 is very small, its output undergoes a large variation. Since the low pass filter is connected in the input of the amplifier 58, its output changes smoothly. The signal level of the output of the CCD 50 is adjusted by supplying the output of the amplifier 58 to the − input of the amplifier 56.

Figure 3:
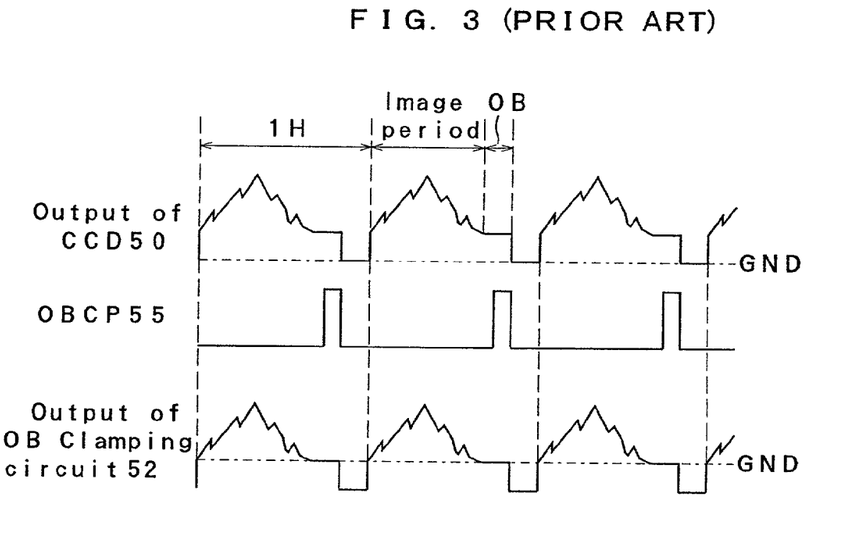
FIG. 3 is a timing chart showing the horizontal timing of the prior art solid state imaging device.
Figure 4:
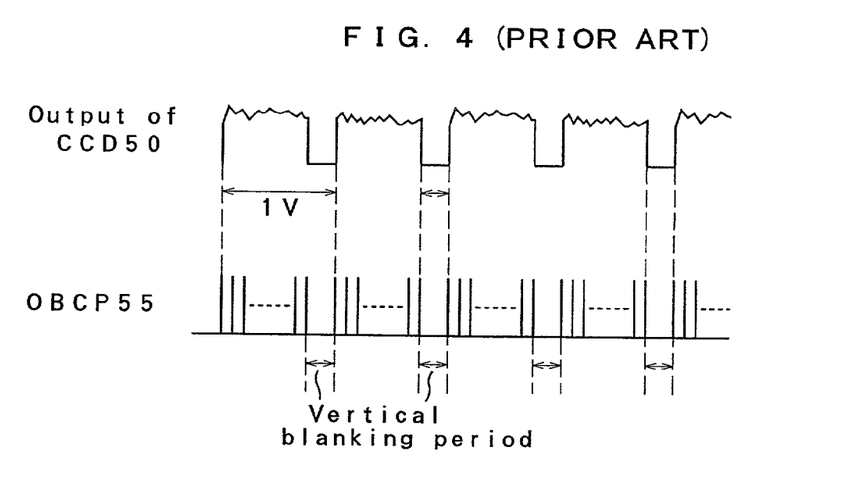
FIG. 4 is a timing chart showing the vertical timing of the prior art solid state imaging device.
Figure 5:
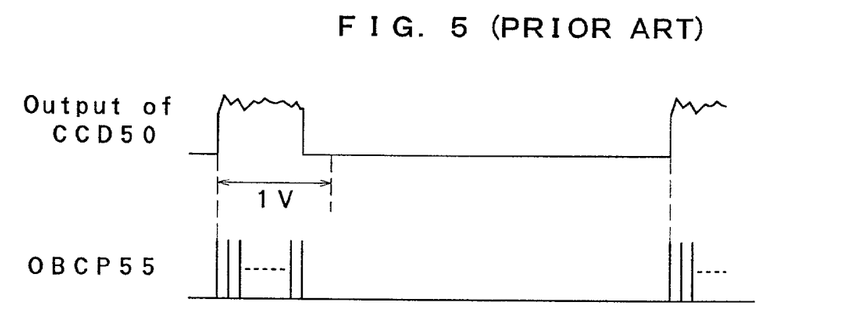
FIG. 5 is a timing chart showing the case of 4-field accumulation by the prior art solid state imaging device.

FIGS. 3 through 5 are timing charts for this solid state-imaging device according to the prior art. FIG. 3 is a horizontal timing chart. Within a single horizontal period (1H) of the output of the CCD 50, there are included an image period and an OB section for signal handling. In the period which corresponds to the OB section, the signal OBCP 55 goes H level, and the switch 57 closes. In other words, the shifted signal level over the entire horizontal period becomes the output of the OB clamping circuit 52, by maintaining the value of the period of the OB section in the capacitor C11.

FIG. 4 is a timing chart showing the vertical timing. In a single vertical period (1V), there is no signal output over the vertical blanking period, and moreover OBCP is not outputted. In normal OB clamping operation, there is no problem even if it is substituted by the voltage which is maintained in the capacitor C11 over the vertical blanking period (about 20 to 50 horizontal periods). In other words, the time constant based on the resistor R10 and the capacitor C10 is such a value as no affection.

FIG. 5 is a timing chart for four-field accumulation. This is operation in a high sensitivity mode when the reading out of the signal from the CCD 50 has been performed once in four. Since, if OB clamping operation is performed when there is no signal output from the CCD 50, an erroneous value will come to be retained, therefore the signal OBCP 55 is always maintained at L level in periods in which there is no output.

In FIG. 4, the level of the period of the OB section of the output of the CCD 50 is almost constant provided that there is no great change of the environment. Under this type of conditions the outputs of the amplifiers 56 and 58 are stabilized at constant values, since the amplifiers 56 and 58 constitute a closed loop. However, if observed rigorously, the output of the amplifier 58 has minute vibration.

Figure 6:
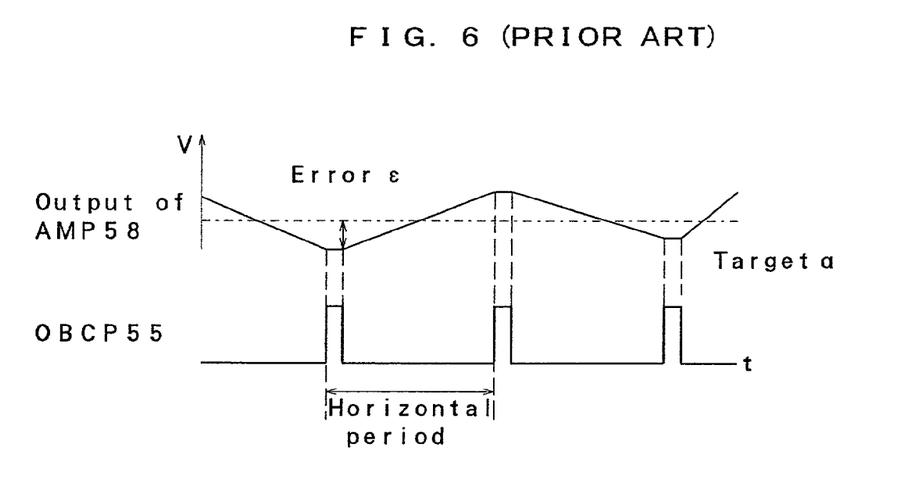
FIG. 6 is a timing chart showing the case of continuous clamping by the prior art solid state imaging device.
Figure 7:
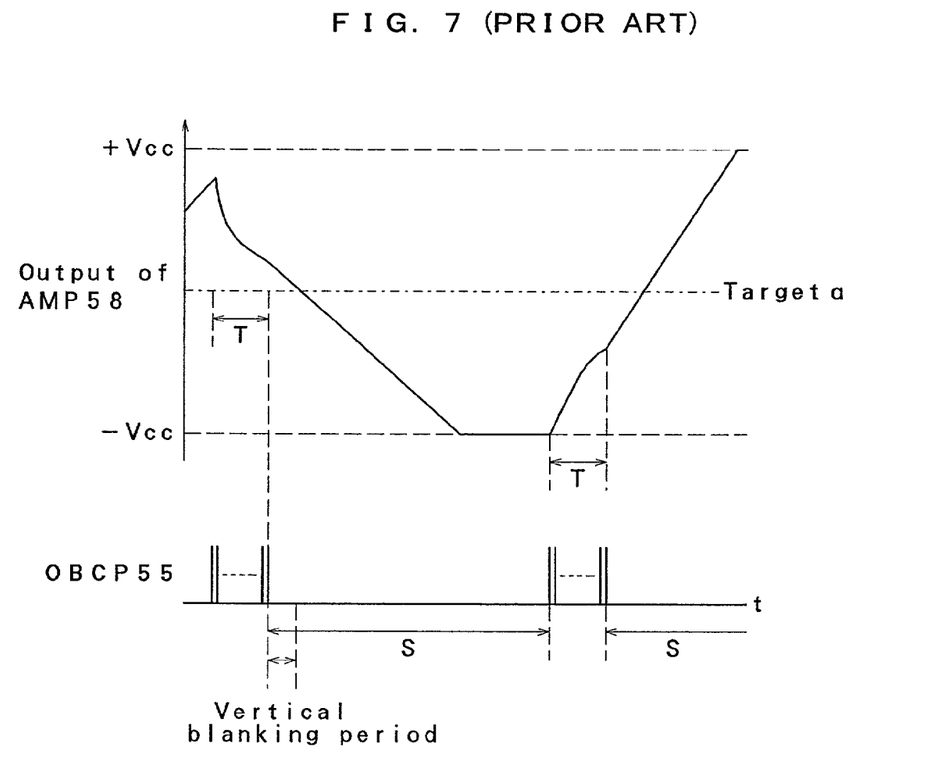
FIG. 7 is a timing chart showing the case of n-field accumulation by the prior art solid state imaging device.

This phenomenon will be explained in the following. FIG. 6 is a timing chart for the case of continuous clamping, while FIG. 7 is one for the case of n-field accumulation. In FIG. 6, the output of the amplifier 58 is shown enlarged upon the vertical axis. The signal OBCP 55 goes H level once in one horizontal period, in the period of the OB section, and its value is maintained in the capacitor C11. At this time the difference between the + input and the − input of the amplifier 58 is amplified according to open loop gain, and as a result the entire level of the output of the amplifier 56 comes to be shifted. After this, when the switch 57 closes again, the value of the OB section whose level has been shifted is inputted to the capacitor C11, and the output of the amplifier 58 also varies.

Accordingly, in FIG. 6, each time the signal OBCP 55 is outputted, the output of the amplifier 58 moves slightly up and down. The target value $\alpha$ is the value at which the output of the amplifier 58 really ought to stabilize, but actually the output of the amplifier 58 oscillates within a range of error $\epsilon$ about the value $\alpha$ as a center. In other words, to consider the entire circuit, when an error $\epsilon$ is detected from the target value $\alpha$ executed by the OB clamping, control is exerted in the direction to suppress this error $\epsilon$.

Since the OB clamping operation is only executed once in a single horizontal period, the remaining period comes to be controlled at the value maintained at this time, and the error $\epsilon$ inevitably occurs. In other words, if the entire period were to be like the OB section (if the switch 57 were to be always turned ON), then the output of the amplifier 58 would reach the target value α. Since, in fact, the OB clamping action cannot be performed except by sampling control, therefore it is quite impossible to eliminate minute oscillations of the output of the amplifier 58.

However, the control method of FIG. 2 is one of the most excellent methods for reducing the error ε. The actual error ε is an extremely small value and from the point of view of the image signal it is a value which can be completely ignored.

However, in the case of this method, a problem arises when the accumulation field number is further increased. In the case of n-field accumulation shown in FIG. 7, the signal OBCP 55 is read out only once in n fields (the period T), while in other periods there is no output of the signal OBCP 55 (the period S). Accordingly, during n−1 fields, the value in the capacitor C11 undergoes almost no change.

As has also been explained with reference to FIG. 6, when at the end the signal OBCP 55 is outputted, the output of the amplifier 58 varies in the direction to suppress the difference from the target value α. Since the control for suppression of the error is not performed over the period S in which the signal OBCP 55 is not outputted, even if the target value α is exceeded, the error continues to increase. Finally it arrives at the power source voltage of the amplifier 58 and saturates, which is undesirable. Thereafter, by the period T starting and the signal OBCP 55 being outputted, the value in the capacitor C11 changes, and the output of the amplifier 58 changes towards the target value α.

However, the period T in which the signal OBCP 55 is outputted is only one vertical period, and when the period S starts without any feedback being performed the error from the target value is magnified as described above, which is undesirable. Since the variation in the output of the amplifier 58 shown in FIG. 7 is inputted to the amplifier 56 just as it is without alteration, this variation is also superimposed upon the input signal to the signal processing circuit 54. This appears as vertical shading upon the final picture signal, and entails a great breakdown of picture quality.

In particular, if as in FIG. 7 the output of the amplifier 58 reaches saturation level (±Vcc), then a great level shift occurs in the picture signal. Since this occurs alternately, a periodic white and black pattern comes to be repeatedly generated, and the same phenomenon occurs as oscillation. If the time constant is made large, this phenomenon can be more or less alleviated, but it is a phenomenon which inevitably occurs if the number of accumulation fields is increased, and it has become a problem which must be avoided at all costs.

Furthermore, if the signal OBCP 55 is regularly outputted including the period S, a signal, which is not outputted from the CCD 50, comes to be maintained in the capacitor C11. In other words, in this state, the normal feedback function does not operate. In this case, great shading is generated in portions where "signal present" changes to "signal absent", or "signal absent" changes to "signal present", and it reaches a level that cannot be restored by compensation processing. If the number of accumulation fields is further increased, the periodic white and black patterns described above may happen.

SUMMARY OF THE INVENTION

The present invention has been conceived of in the light of the problematical points raised above, and its objective is to propose a solid state imaging device which is so constructed that shading or oscillatory phenomena are not caused, even when charge is accumulated in the solid state imaging elements by a plurality of fields.

The solid state imaging device, of the present invention comprises a solid state imaging element, a timing signal generation circuit, and a clamping means. The timing signal generation circuit generates an optical black clock pulse indicating an optical black section, and an enable signal indicating the timing when an output from a solid state imaging elements stops. The clamping means comprises a target value setting means which sets a target value for output and an amplifier means which amplifies the difference between the target value and an optical black signal obtained at the timing of a optical black pulse, and along with feeding back a difference value, matches the signal level of the optical black section outputted from the solid state imaging element to the constant value by maintaining the target value of the optical black section while the enable signal outputted from the timing signal generation circuit is being obtained.

DETAILED DESCRIPTION OF THE PREFERRED EMBODIMENTS

Embodiment 1

Figure 8:
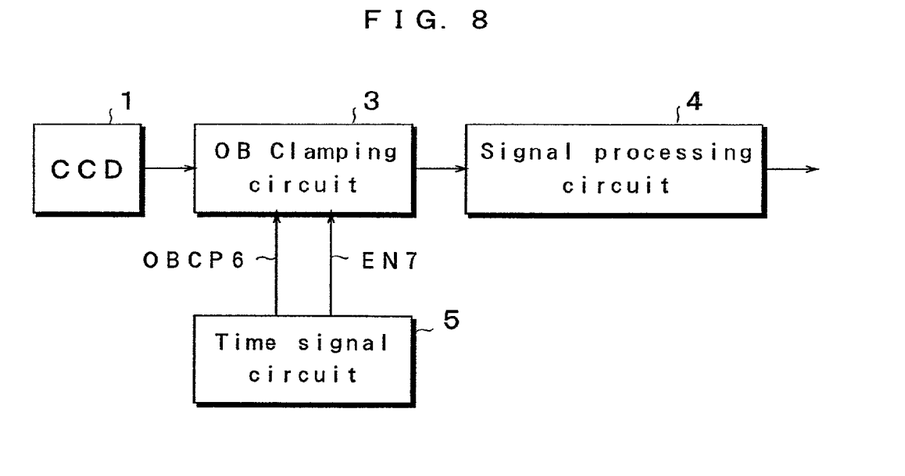
FIG. 8 is a block diagram showing an overall structural view of a solid state imaging device according to a first preferred embodiment of the present invention.

A first preferred embodiment of the present invention will be explained with reference to the drawings. FIG. 8 is a block diagram showing an overall structural view of a solid state imaging device according to this first preferred embodiment of the present invention. In FIG. 8, the signal from a CCD 1 is supplied to a signal processing circuit 4 via an OB clamping circuit 3. In the OB clamping circuit 3, a timing signal generation circuit 5 generates an optical black clamping pulse signal (OBCP) 6 and an enable signal 7 (hereinafter termed "EN"). Clamping is performed by optical black in the OB clamping circuit 3, and the OB section is set as reference level. After this, gamma and knee processing etc. are performed by the signal processing circuit 4, and it is then outputted.

Figure 9:
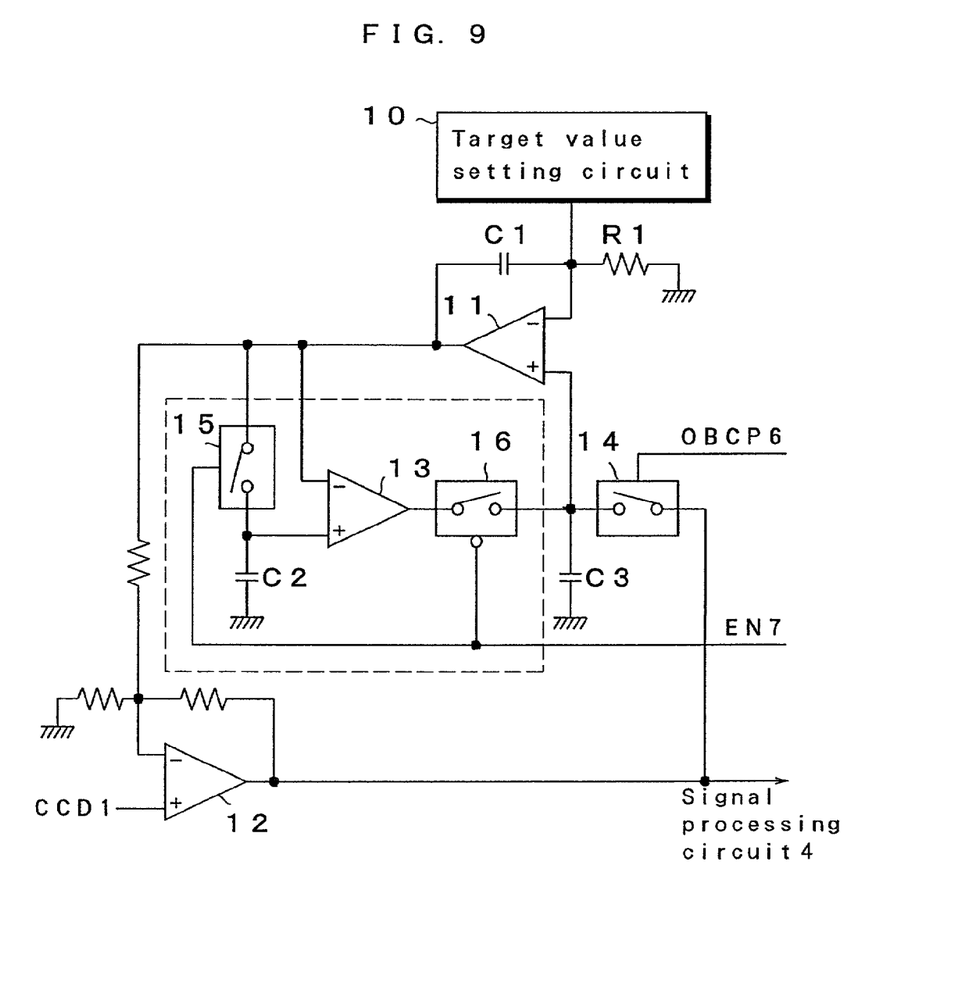
FIG. 9 is a block diagram of an OB clamping circuit incorporated therein.

FIG. 9 is a block diagram showing the structure of the OB clamping circuit 3. In this embodiment, an amplifier 12 corresponds to the first amplifier means, an amplifier 11 corresponds to the second amplifier means, and an amplifier 13 corresponds to the third amplifier means. And a switch 14 and a capacitor C3 which is a retention section correspond to the first sampling means, a switch 15 and a capacitor C2 correspond to the second sampling means, and a switch 16 corresponds to the switching means.

In FIG. 9, the output of the CCD 1 is inputted to the amplifier 12 and is amplified. The amplifier 12 feeds its output signal to the signal processing circuit 4, and further to the capacitor C3 and to the + input of an amplifier 11 via a switch 14. A target value setting circuit 10 is a device which sets a target value α for the output of the amplifier 11, and normally is constituted by a variable resistor or the like which divides the voltage ±Vcc of the power source. The target value α is input to the − input of the amplifier 11 and to a low pass filter (LPF), which comprises a resistor R1, and a capacitor C1.

The distinguishing characteristic of this first preferred embodiment is that it is provided with the portion which is delineated by a broken line in the figure, in other words with the amplifier 13, the switch 15, the switch 16, and the capacitor C2. In this first embodiment, when n-field accumulation is being performed, the signal OBCP 6 is not outputted during the period for (n−1) fields. During the period which the signal OBCP 6 is not outputted, the switch 16 is ON and the output of the amplifier 13 is inputted to the capacitor C3 and to the + input of the amplifier 11. Thus this device works as feedback control circuit, since a feedback signal is fed to the amplifier 11.

Figure 10:
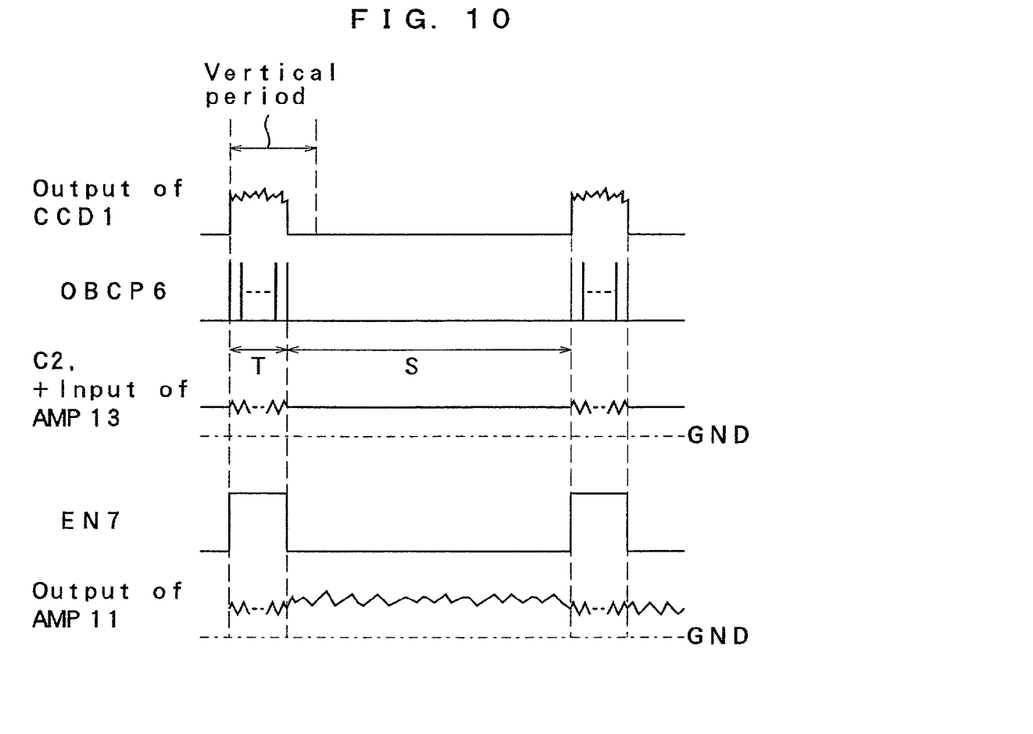
FIG. 10 is a timing chart for the first embodiment during n-field accumulation.
Figure 11:
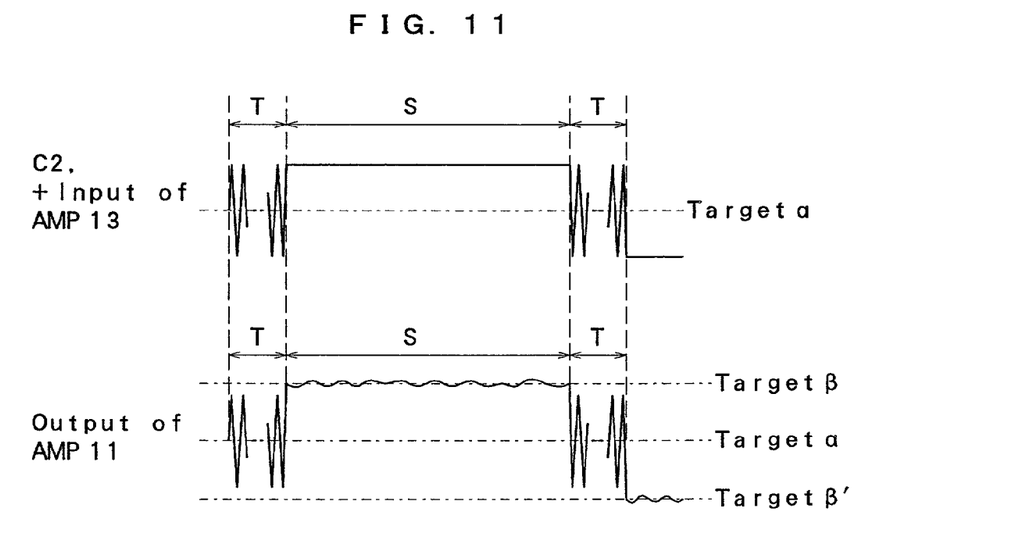
FIG. 11 is a partial enlarged timing chart for the first embodiment.

The operation of the first preferred embodiment will be explained with reference to timing charts thereof. FIG. 10 is a timing chart for this first preferred embodiment during n-field accumulation, while FIG. 11 is a version thereof with the amplitude enlarged. The CCD 1 outputs for just one vertical period, and the signal OBCP 6 also operates in the vertical period, and steps during the period S. In the period T the signal OBCP 6 goes to ON at a timing of each individual horizontal period, and the signal which has been inputted to the capacitor C3 is fed back via the amplifiers 11 and 12. Accordingly the voltage of the capacitor C3 during the period T3 varies around some constant value as a center, while during the period S its last value is maintained. In the period S the switch 14 goes to the open state, and the feedback signal is no longer obtained.

On the other hand, the signal EN 7 is supplied from the timing signal generation circuit 5 to the switches 15 and 16, so that their ON/OFF is controlled. As shown in FIG. 10, during the period T the signal EN 7 goes to H level, while during the period S it goes to L level. During the period T in which the signal EN 7 is H level, the switch 15 is in the ON state (closed), while the switch 16 is in the OFF state (open), and the output value of the amplifier 11 is inputted to the capacitor C2. Accordingly it never happens that the switches 14 and 16 are ON at the same time.

In the period S in which the signal EN is L level, the switch 15 is OFF, and the average value of the output of the amplifier 11 is maintained in the capacitor C2, while the switch 16 is in the ON state. The output of the capacitor C2 and the output of the amplifier 11 are inputted to the amplifier 13, and the difference thereof is amplified therein and is supplied to the capacitor C3. As a result if this, the output of the amplifier 11 is altered by the operation of feedback control.

FIG. 11 shows an enlarged view of a portion of the FIG. 10. Herein, the level of the capacitor C2 and the output level of the amplifier 11 are shown, and it will be understood that over the period T they vary around the target value α as a center. Since the level in the capacitor C2 is held when the period S starts, its value at the end of the period T is maintained. The level of the capacitor C2 becomes a constant value and its value is reflected in the capacitor C3, so that the output of the amplifier 11 is shifted. At this time the amplifier 11 varies a little around the target value β as a center, but since it is influenced by the value at which the capacitor C2 was finally held, each time the period S starts the target value varies at the values β, β' or like.

Although FIG. 11 shows an enlarged view for the convenience of explanation, in actual fact the difference between the target values α and β is an extremely small value and this level of variation proves to be no problem at all since it is within the normal range of OB clamping action. Accordingly the OB clamping action functions normally, even if the field accumulation number n is increased (so that the period S is increased).

Figure 12:
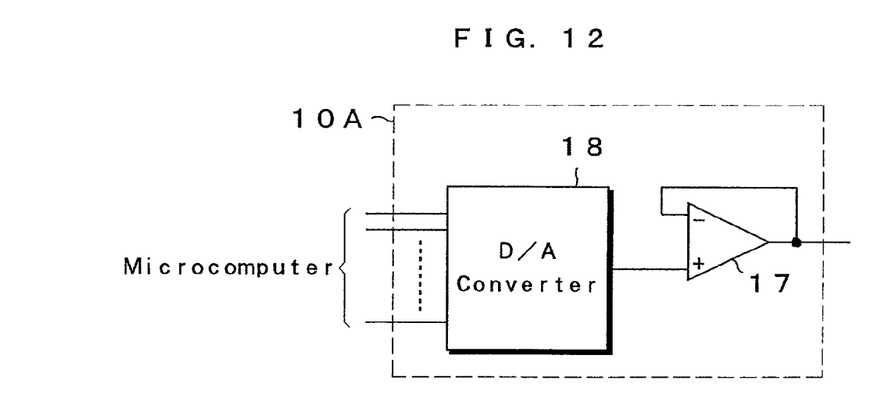
FIG. 12 is a block diagram showing another structure for a target value setting circuit for the first embodiment.

FIGS. 12 through 15 are views showing other structures for various elements of this first preferred embodiment. FIG. 12 shows a target value setting circuit 10A. In the target value setting circuit 10A, a digital signal, which is outputted from a microcomputer not shown in the figure, is converted into an analog signal by a D/A converter 18. And after impedance conversion by an amplifier 17, this signal is inputted to the − input terminal of an amplifier 11 shown in FIG. 9. With this construction there is the benefit that adjustment becomes very easy, since the target value is varied by the microcomputer.

Figure 13:
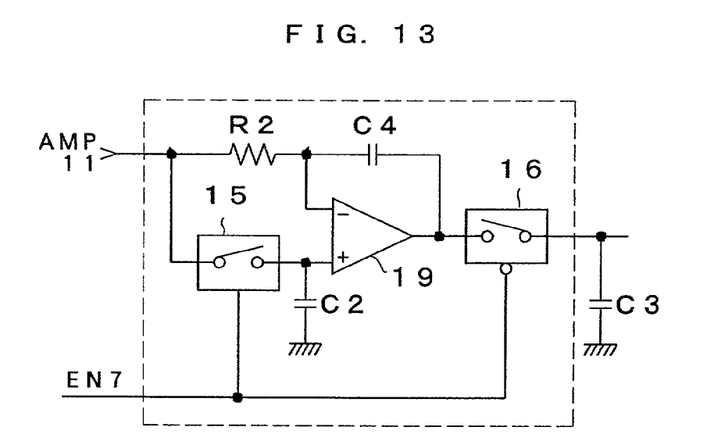
FIG. 13 is a block diagram showing another structure for a portion of FIG. 9 which is delineated by a broken line therein.

FIG. 13 is a block diagram showing another structure for the block, which is delineated in FIG. 9 by the broken line. In this structure, the capacitor C2 and the switch 15 are the same as in FIG. 9, while a resistor R2 and a capacitor C4 which constitute a LPF are connected to the − input terminal of an amplifier 19; and this structure operates to suppress too sudden variations.

Figure 14:
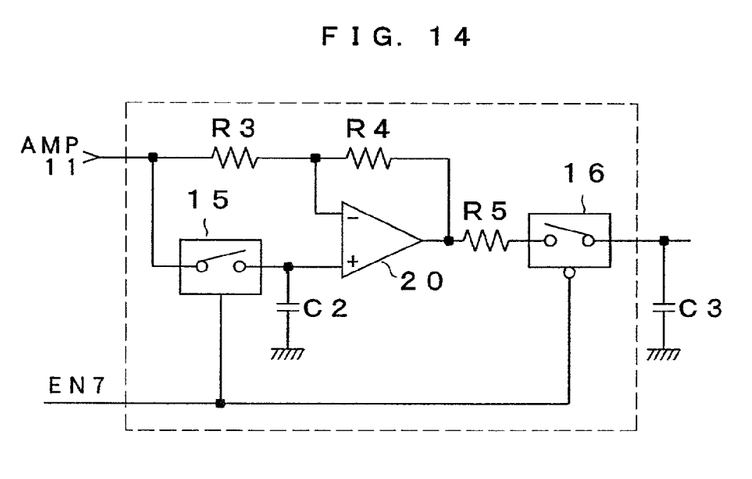
FIG. 14 is a block diagram showing yet another structure for this portion of FIG. 9 which is delineated by the broken line therein.

FIG. 14 is also a block diagram showing yet another structure for the block which is delineated in FIG. 9 by the broken line. In this case, instead of using high gain amplifiers like the amplifier 13 and the amplifier 19, sudden variations are suppressed by using an amplifier 20 which is set to low gain by resistors R3 and R4.

Further, if the switch 16 is closed, a resistor R5 and the capacitor C3 constitute an LPF, and this further acts to suppress variation. It should be noted that it would be possible to obtain the same type of benefit simply by connecting the resistor R5 to the amplifier 13 shown in FIG. 9, so as to constitute the LPF.

Embodiment 2

Figure 15:
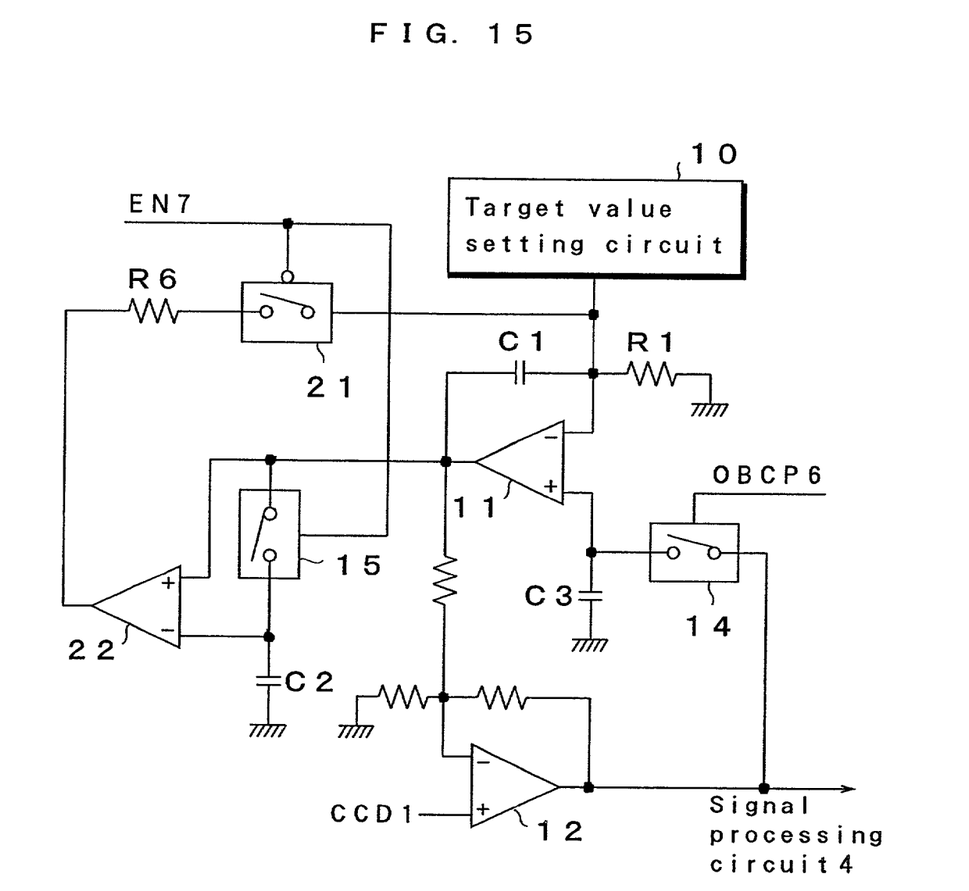
FIG. 15 is a block diagram showing the structure of an OB clamping circuit which is incorporated in a solid state imaging device according to a second preferred embodiment of the present invention.

A second preferred embodiment of the solid state imaging device of the present invention will now be explained with reference to the figures. FIG. 15 is a block diagram showing the structure of an OB clamping circuit, which is incorporated in this solid state imaging device according to the second preferred embodiment. In the first preferred embodiment described above the output of the amplifier 11 was held, and was fed back to the + input of the amplifier 11. However, the characteristic feature of this second embodiment is that in this case it is fed back to the − input of the amplifier 11. In FIG. 15, elements, which correspond to elements of the first preferred embodiment, are denoted by the same reference symbols. Furthermore, with regard to the operation of this second preferred embodiment as well, portions, which are denoted by the same reference symbols, as appear in FIG. 9 correspond to like portions for the first embodiment.

Moreover, in this second embodiment, an amplifier 22 corresponds to the third amplifier means, while a switch 21 corresponds to the switching means. The output of the amplifier 11 is inputted via the switch 15 to the capacitor C2 and to − the input terminal of the amplifier 22. Furthermore, the output terminal of the amplifier 11 is directly connected to the + input terminal of the amplifier 22. A resistor R6 is connected to the output terminal of the amplifier 22, and thus the signal is fed back via the switch 21 to the − input terminal of the amplifier 11.

Figure 16:
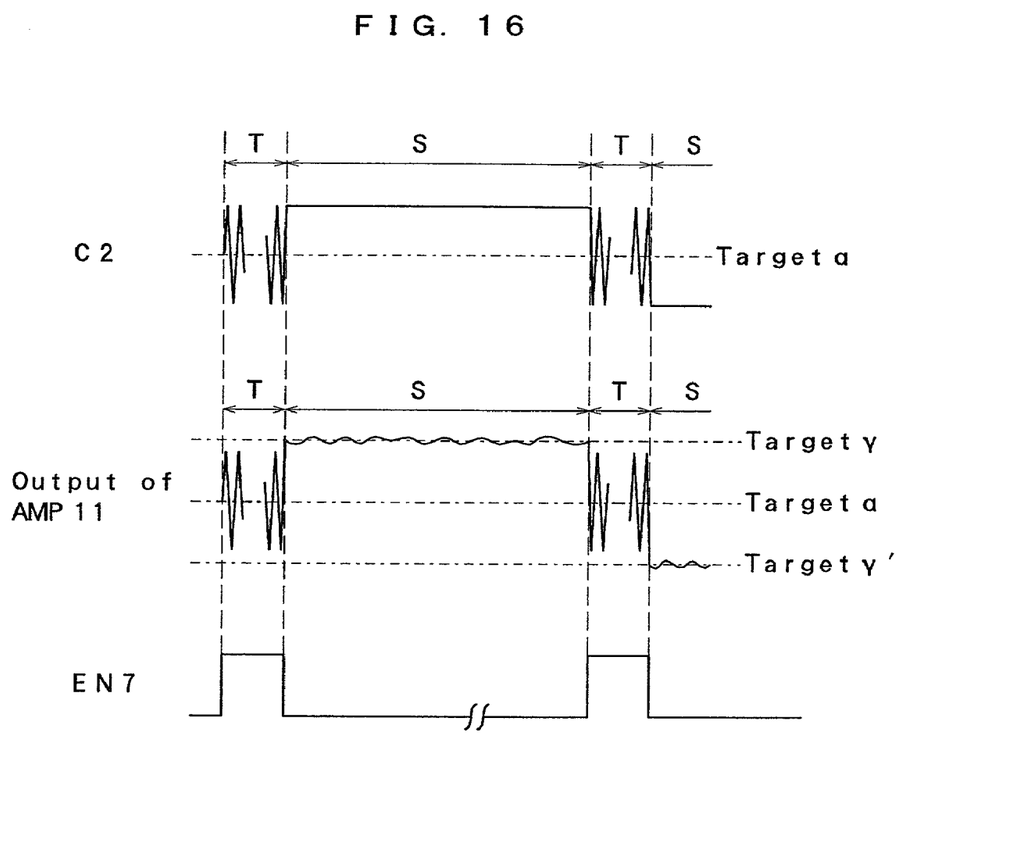
FIG. 16 is an enlarged timing chart for the second embodiment.

The operation of this second preferred embodiment will be explained with reference to FIG. 16, which is an enlarged timing chart thereof. The portions, which are the same as in the first preferred embodiment described above, are the same as in FIGS. 10 and 11. During the period T when the signal EN 7 is at H level, the switch 15 is in the ON state and the switch 21 is in the OFF state, while, during the period S when the signal EN 7 is at L level, the switch 15 is in the OFF state and the switch 21 is in the ON state. When the signal EN is at L level and the switch 21 is ON, the output of the amplifier 22 is fed back to the − input terminal of the amplifier 11 via this switch 21. As shown in FIG. 16, during the period T, the output of the amplifier 11 is supplied to the capacitor C2 just as it is without alteration, while, during the period S, its instantaneous value is continually maintained as the period S elapses. Furthermore, since the value which is maintained in the capacitor C2 is fed back to the amplifier 11, therefore during the period T the output of the amplifier 11 varies about the target value $\alpha$ as a center, but during the period S it assumes the value $\gamma$ or $\gamma'$.

Accordingly the OB clamping action functions normally, even if the period S becomes longer as the field accumulation number n increases. In the first embodiment described above, the polarity of the input to which the output of the amplifier 11 and the capacitor C2 were connected and the polarity of the feedback to the input of the amplifier 11 were opposite. Thus, by these two having opposite polarities, it becomes possible to implement the same operation as in the case of the first embodiment.

Embodiment 3

Figure 17:
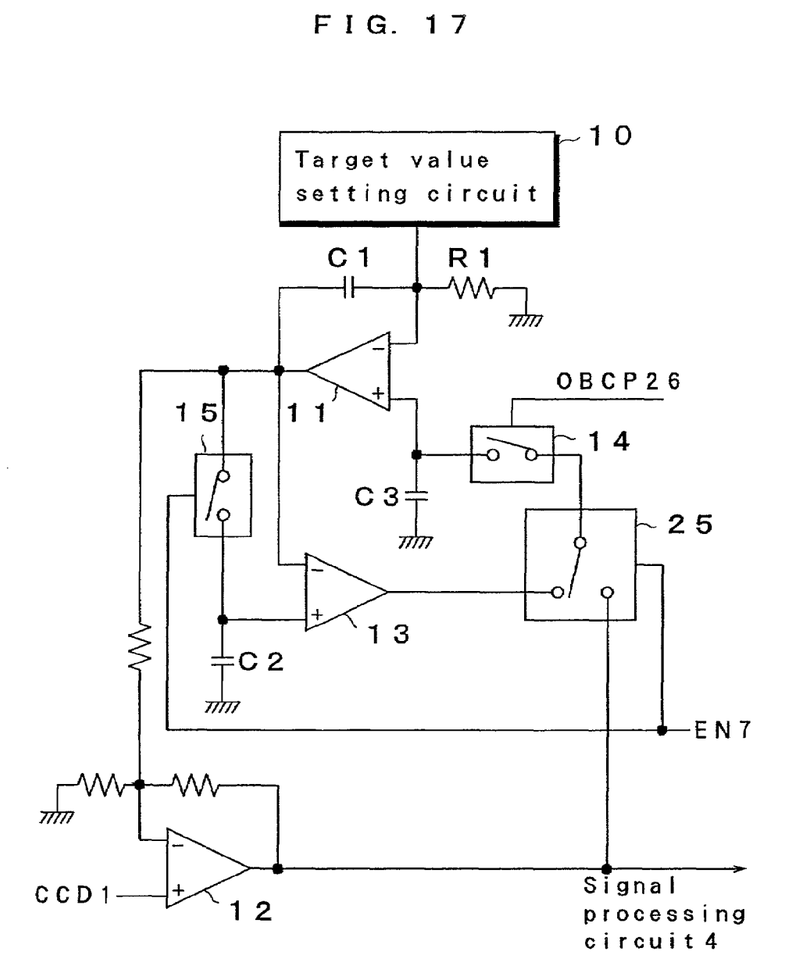
FIG. 17 is a block diagram showing the structure of an OB clamping circuit which is incorporated in a solid state imaging device according to a third preferred embodiment of the present invention.

FIG. 17 is a block diagram showing the structure of an OB clamping circuit which is incorporated in a solid state imaging device according to a third preferred embodiment of the present invention. In this embodiment, elements, which correspond to elements of the first and second embodiments shown in previous figures, are denoted by the same reference symbols, and, description the operation of the denoted portion by the same reference symbols of this third embodiment is omitted. In the third embodiment, a switch 25 corresponds to the switching means. The characteristic feature of the third embodiment is that in this case the signal OBCP 26 always operates intermittently. The switch 25 is a changeover switch, which selects the output of the amplifier 12 or the output of the amplifier 13 according to the signal EN 7, and supplies it to the switch 14.

Figure 18:
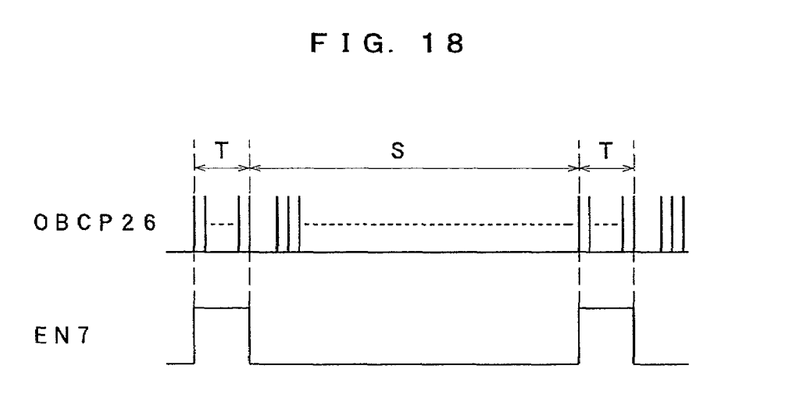
FIG. 18 is an enlarged timing chart for the third embodiment.

Next the operation of this embodiment will be explained using FIG. 18, which is an enlarged timing chart thereof. Except for during the vertical blanking period, the signal OBCP 26 is not only outputted during the period T, it is also outputted intermittently during the period S as well. During the period T the signal EN is at H level, and at this time the switch 25 selects the output of the amplifier 12 and supplies it to the amplifier 14. Moreover during this period T, since normal operation is taking place, the level of the OB section of the CCD 1 is inputted to the capacitor C3. On the other hand, during the period S the signal EN is at L level, and at this time the switch 25 selects the output of the amplifier 13. Accordingly, in the period S, the output of the amplifier 13 is inputted to the capacitor C3 of the sampling means and is sampled.

As a result operation of the signal OBCP 26 at continuous output becomes possible, without any dependence upon whether normal operation or n-field accumulation is taking place. Although during the period S the signal which is supplied to the capacitor C3 from the output of the amplifier 13 becomes discrete, this causes no problem at all, since there is no difference between this situation and normal sampling control. Moreover, during the period S, any width and timing for the pulses of the signal OBCP 26 which is convenient will be acceptable.

Embodiment 4

Figure 19:
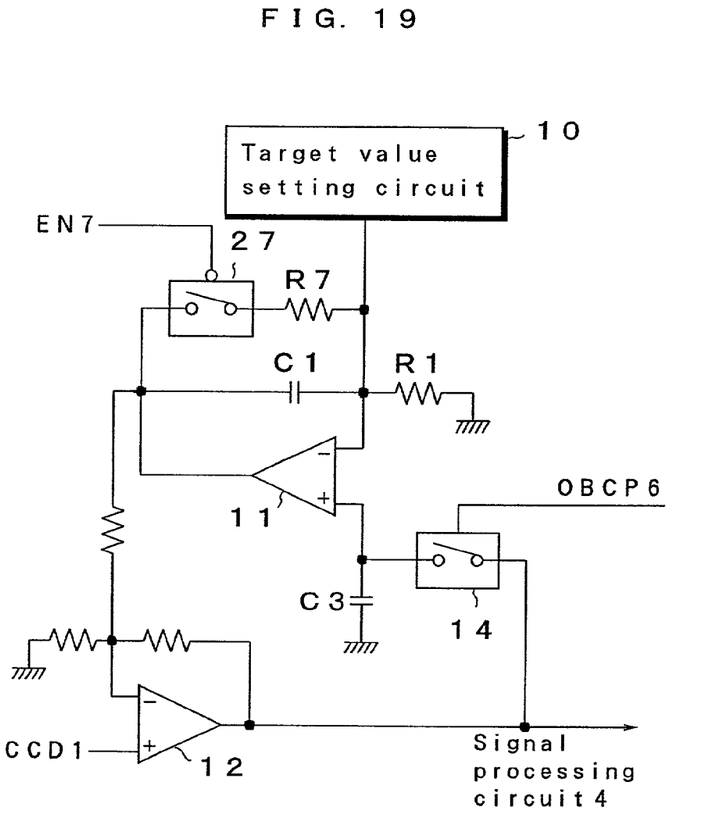
FIG. 19 is a block diagram showing the structure of an OB clamping circuit which is incorporated in a solid state imaging device according to a fourth preferred embodiment of the present invention.

FIG. 19 is a block diagram showing the structure of an OB clamping circuit which is incorporated in a solid state imaging device according to a fourth preferred embodiment of the present invention. In the fourth embodiment, elements, which correspond to elements of the first to the third embodiments shown in previous figures, are denoted by the same reference symbols, and furthermore, with regard to the operation thereof, portions denoted by the same reference symbols are omitted. In this fourth embodiment, a switch 27 corresponds to the switching means. The characteristic feature of this embodiment is that in this case, although during the period T the resistor R1 and the capacitor C1 constitute a low pass filter, during the period S the resistor R1 and a resistor R7 constitute an amplification circuit.

The switch 27 is controlled by the signal EN 7, and, since the switch 27 is in the open state when said signal EN 7 is H level, at this time the resistor R1 and the capacitor C1 constitute an LPF. Further, when the signal EN 7 is L level, then the switch 27 is in the closed state, and an amplification circuit is constituted by the amplifier 11, the resistor R1 and the resistor R7, while the resistor R7 and the capacitor C1 constitute an LPF.

Figure 20:
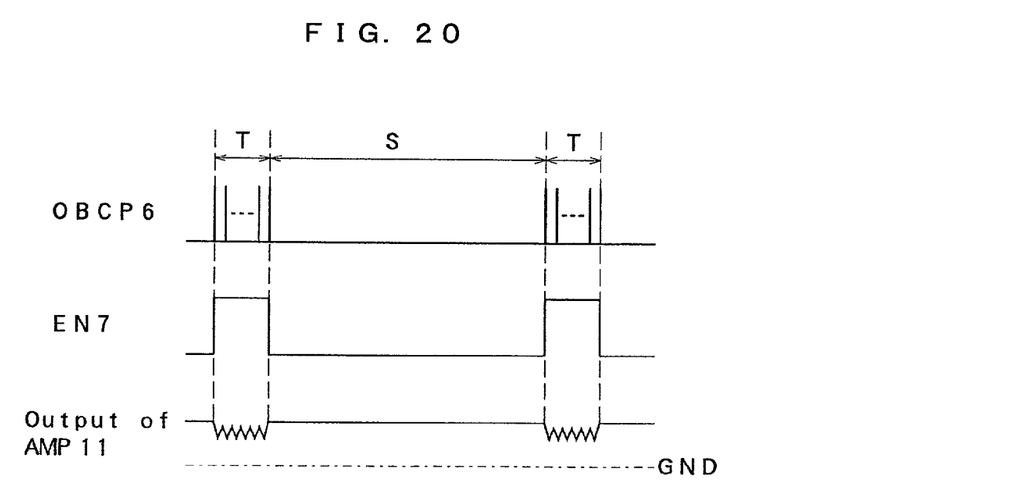
FIG. 20 is an enlarged timing chart for the fourth embodiment.

The operation of the fourth embodiment will be explained using FIG. 20, which is an enlarged timing chart thereof. As shown in this figure, the operation of the signals OBCP 6 and EN 7 are the same as in the first and the second embodiments described above. Although in the prior art during the period S the output of the amplifier 11 rose until it reached the power source voltage ±Vcc, by contrast in the fourth embodiment it only varies up to a value which is determined by the target value setting circuit 10 and the resistors R1 and R7. Accordingly, during the period S, the output of the amplifier 11 comes to assume a constant value as a result, it is possible to suppress the occurrence of shading to a minimal limit. Furthermore, with a structure in which the switch 27 is made as a two-input type switch, which selects one of the capacitor, C1 and the resistor R7, the influence of the LPF also completely disappears.

Embodiment 5

Figure 21:
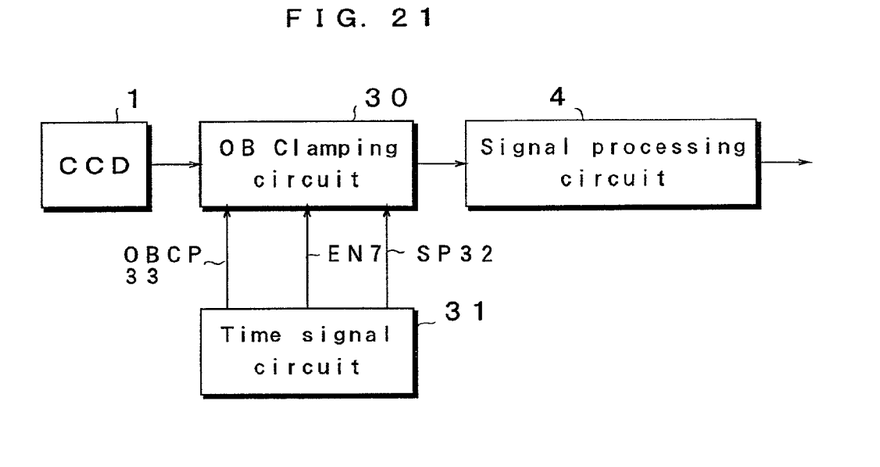
FIG. 21 is a block diagram showing a overall structure of a solid state imaging device according to a fifth preferred embodiment of the present invention.
Figure 22:
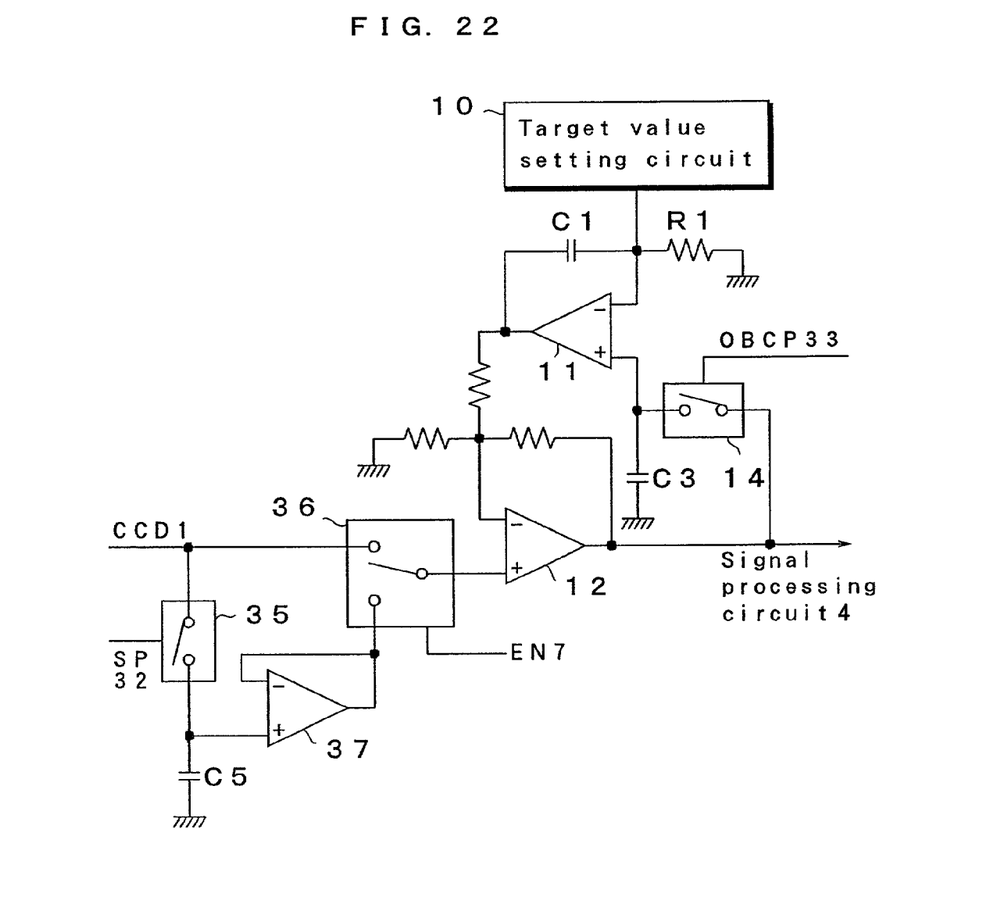
FIG. 22 is a block diagram of an OB clamping circuit which is incorporated in this solid state imaging device according to the fifth embodiment of the present invention.

A fifth preferred embodiment of the solid state imaging device according to the present invention will now be explained with reference to the figures. FIG. 21 is an overall structural view showing this solid state imaging device according to the fifth preferred embodiment, while FIG. 22 is a block diagram showing the structure of an OB clamping circuit incorporated therein. In this fifth embodiment, elements, which correspond to elements of the first through the fourth preferred embodiments shown in previous figures, are denoted by the same reference symbols, and furthermore, with regard to the operation thereof, portions denoted by the same reference symbols are omitted. In this fifth preferred embodiment, a switch 35, a capacitor C5 and an amplifier 37 correspond to the second sampling means, while a switch 36 corresponds to the selection means.

Referring to FIG. 21, the output of the CCD 1 is supplied to the signal processing circuit 4 via the OB clamping circuit 30. The signal EN, a sampling signal (hereinafter referrers to as the signal SP) 32, and the signal OBCP 33 are supplied from a timing signal generation circuit 31 to the OB clamping circuit 30. The distinguishing feature of this fifth embodiment is that the level corresponding to the OB section is maintained over the period S. A problem with prior art structures has been that the output signal from the CCD 1 is generated only once in n-filed. With this fifth preferred embodiment, the portion of the output of the CCD 1, which corresponds to the OB section, is held during the period S. By doing this, the situation becomes equivalent to the signal from the CCD 1 always being outputted, and problems with regard to the OB clamping action are eliminated. That is to say, the output of the amplifier 11 does not swing as far as the power source voltage ±Vcc, even if the OB clamping action is continuously performed.

In FIG. 22, the output of the CCD 1 is supplied to the + input terminal of the amplifier 12 via the switch 36. The output of the CCD 1 is also outputted to the capacitor C5 and the amplifier 37 via the switch 35. The amplifier 37 is a voltage follower circuit, and its output is supplied to one of the input terminals of the switch 36. The switch 35 is controlled by the sampling signal SP 32, and the switch 36 is controlled by the enable signal EN.

Figure 23:
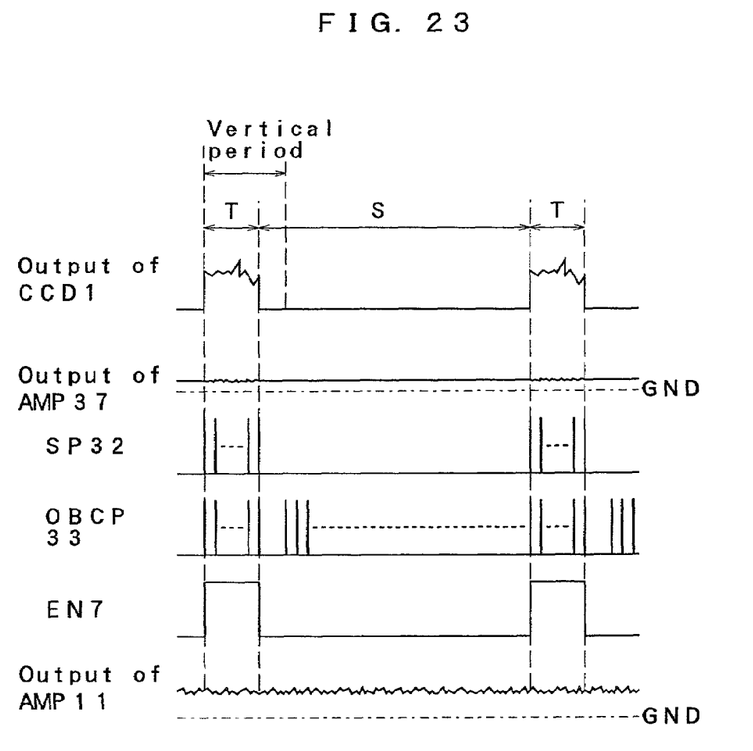
FIG. 23 is a timing chart showing the vertical timing of this solid state imaging device according to the fifth embodiment of the present invention.
Figure 24:
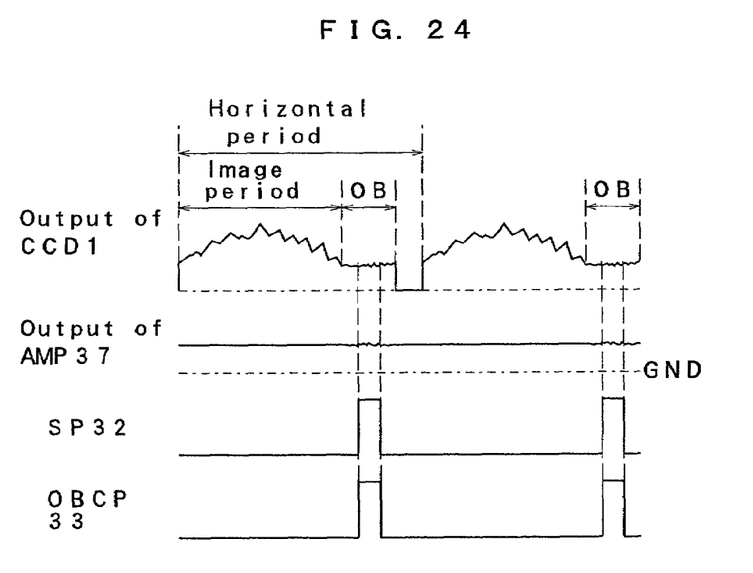
FIG. 24 is a timing chart showing the horizontal timing of this solid state imaging device according to the fifth embodiment of the present invention.

FIG. 23 is a vertical timing chart for this fifth embodiment, while FIG. 24 is a horizontal timing chart thereof. The timing of the operation of the fifth embodiment will now be explained in detail referring to FIGS. 22 through 24.

The sampling signal SP 32 is outputted just over the period T of the OB section, and when this signal SP 32 is H level the switch 35 is closed. By this action, the level of a portion, which corresponds to the OB output of the CCD 1, is sampled by the capacitor C5, and the last value when SP 32 goes to L level is held. Accordingly the output of the amplifier 37 becomes a constant value during the period S since it is held, although it varies roughly during the period T. This level is impedance converted by the amplifier 37 and is supplied to the switch 36. During the period T in which the signal from the CCD 1 is outputted, the signal EN 7 is H level, so that the switch 36 selects the output of the CCD 1.

Furthermore, when the signal EN 7 is L level, the switch 36 selects the output of the amplifier 37. Since as shown in FIG. 23 the signal OBCP 33 is always output intermittently except during the vertical clamping period, therefore feedback to the amplifier 11 is always performed. Accordingly, the output of the amplifier 11 never swings as far as the power source voltage.

Moreover it goes without saying that, in the second through the fifth embodiments of the present invention, other constructions could be employed for the target value setting circuit 10A shown in FIG. 12 and so on. Furthermore, as a matter of course, various other variations are possible, provided that the gist of the present invention is fulfilled.

With the solid state imaging device according to the present invention as described above, there is no occurrence of the phenomenon of generation of shading or of a repeated black and white pattern of oscillatory form, even when multi-field accumulation operation is performed. Moreover, the present invention is extremely effective in application, since it is possible to implement these beneficial effects by means of a very simple structure.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

The text of Japanese priority application no. 2000-190643 filed Jun. 26, 2000 is hereby incorporated by reference.

What is claimed is:

1. A solid state imaging device which comprises a clamping means which matches a signal level of an optical black section outputted from a solid state imaging element to a constant value, in which said clamping means comprises:
 a first amplifier means which inputs the output of said solid state imaging element at one of its input terminals;
 a first sampling means, which includes a switch which goes ON during said optical black section and a retention section, and which samples the output of said first amplifier means;
 a target value setting means which sets a target value for output;

a second amplifier means which receives the output from said first sampling means and said target value level from said target value setting means via a low pass filter means, amplifies the difference between them, and inputs it to said first amplifier means;

a second sampling means which samples the output of said second amplifier means during a period when an output signal is obtained from said solid state imaging element;

a third amplifier means which amplifies the difference between an output of said second amplifier means and an output of said second sampling means; and a switching means which connects an output terminal of said third amplifier means to said retention section of said first sampling means during a period in which no signal is being outputted from said solid state imaging element, and terminates this connection during a period in which a signal is being outputted from said solid state imaging element.

2. A solid state imaging device according to claim 1, in which said third amplifier means is a differential amplification device of the open loop type.

3. A solid state imaging device according to claim 1, in which said target value setting means comprises:

a D/A converter which converts the data of said target value to an analog signal; and a buffer amp which impedance converts the output of said D/A converter.

* * * * *